United States Patent Office 3,460,981
Patented Aug. 12, 1969

3,460,981
WATER REPELLENT AND/OR RELEASE TREATMENT
Joseph Woodward Keil, Midland, Mich., and Clyde Lee Whipple, Stamford, Conn., assignors to Dow Corning Corporation, Midland, Mich., a corporation of Michigan
No Drawing. Continuation of application Ser. No. 461,495, June 4, 1965. This application Feb. 27, 1968, Ser. No. 708,522
Int. Cl. C03c 17/32
U.S. Cl. 117—135.1      14 Claims

ABSTRACT OF THE DISCLOSURE

A method of treating surfaces to render them water repellent and/or to facilitate the removal or release of ice therefrom by the application of certain silicone copolymers or the salts thereof to is disclosed. The method of this invention is particularly applicable to the treatment of airplane, ship and automobile surfaces.

SPECIFICATION

This application is a continuation of application Ser. No. 461,495, filed June 4, 1965, and now abandoned which application was a continuation-in-part of abandoned application Ser. No. 241,533, filed Dec. 3, 1962.

This invention relates to a method of treating surfaces to render them water repellent and/or to facilitate the removal or release of ice therefrom which comprises applying to said surfaces a silicone copolymer or the salts thereof.

The problem of removing ice from windshields (either glass or plastic), freezers, siliceous surfaces, airplanes, ships, metals, painted surfaces and polar substrates in general has been a long standing and annoying problem.

Many attempts have been made to solve this problem but these attempts have met with little, if any success. One approach to the problem has been to incorporate a substance into the article as it is being made to try to render it ice-phobic. This approach has shown little promise thus far. Another, and more promising approach to the problem of ice removal has been to apply a coating or film to which ice has little adhesion to surfaces where ice tends to form. Such films should, of course, have good film integrity, abrasion resistance and adequate substrate adhesion. It is into the latter category that applicants' invention falls.

Another problem is that of rendering surfaces, such as airplane and automobile windshields, water repellent. It has now been found that the method of this invention can be employed to render surfaces water repellent, excellent repellency being obtained but not at the sacrifice of clarity or durability as has generally been the case with materials employed heretofore.

Applicants have discovered a method for treating the surface of a substance to render it water repellent and/or to facilitate the release of ice therefrom which comprises applying to said surface a copolymer selected from the group consisting of copolymers having the general formula

and the salts thereof derived from monocarboxylic acids containing 1 to 3 carbon atoms, wherein $x$ has a total value of from 10 to 400, $n$ is an integer from 0 to 2 inclusive, R is an alkyl radical containing 1 to 7 inclusive carbon atoms, A is a divalent hydrocarbon radical selected from the group consisting of the —(CH$_2$)$_3$— and —CH$_2$CH(CH$_3$)CH$_2$— radicals and Q is selected from the group consisting of hydrogen, —CH$_3$ and

—CH$_2$CH$_2$NH$_2$

The term "$x$ has a total value" means that the value of $x$ gives the total number of dimethylsiloxane units (unit weight 74) in the copolymer. It also means that where more than one dimethylsiloxane segment is present in the copolymer ($n$=0 or 1), the various segments can contain the same or different numbers of dimethylsiloxane units.

Examples of suitable salts are the formate, acetate and propionate salts. The acetate salt is preferred.

Examples of alkyl radicals which are represented by R are the methyl, ethyl, propyl, butyl, amyl, hexyl, heptyl, and isopropyl radicals. When more than one R is present, that is when $n$ is 2, the alkyl radicals may be the same or different.

The copolymer can be applied to the surface to be treated as a solution in a suitable solvent. Examples of suitable solvents are methanol, ethanol, isopropyl alcohol, acetone, water, an isopropyl alcohol-water mixture, aliphatic hydrocarbons, halogenated aliphatic hydrocarbons, glycols, mineral spirits, polydimethylsiloxane fluids, mixtures of the foregoing solvents, etc. The concentration of the copolymer in the solvent can vary over a wide range. Amounts ranging from about 0.025 to about 50 percent by weight can be used with satisfactory results.

Any suitable method of applying the copolymer to the surface to be treated can be employed. The copolymer can be applied by brushing, dipping, wiping or spraying the copolymer onto the surface to be treated employing any of the conventional application techniques.

The effectiveness of the ice release formulations set forth in the examples below were measured employing an apparatus like that set forth in the article, "Ice Adhesion and Test Method" by Lacks et al. which appeared in the ASTM Bulletin No. 224 on pp. 48–50 (1957). The apparatus does not record values of less than 3 pounds per square inch (p.s.i.). The upper limit of the test is about 33 p.s.i. and indicates substantially no ice release. The values measured by the apparatus are accurate to about ±2 to 3 p.s.i., hence the different values obtained from seemingly identical tests. However, all the results fall within the acceptable range. A value of 15 p.s.i. or less is considered to be a good release value. The lower the release value obtained, the better the ice release agent.

The coated panels of all the examples were tested using the apparatus referred to above to determine their ice release values. All concentrations are in percent by weight unless otherwise specified.

EXAMPLE 1

An ice release formulation was made by mixing 20 g. of a hydroxylated polydimethylsiloxane fluid containing about 3.5 to 4.5 percent by weight of hydroxyl groups and having a viscosity in the range of 35 to 50 cs. at 25° C., 1.6 of a silane of the formula

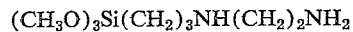

1.2 g. of acetic acid and 20.8 g. of isopropyl alcohol. The resultant product was a solution of the acetate salt of the copolymer of the formula

(wherein $x$ has a total value of about 12) in isopropyl alcohol. This product represents the preferred embodiment of this invention.

The copolymer salt of Example 1 was applied to various panel materials in different concentrations in isopropyl alcohol and then wiped with a tissue until dry. The results are set forth in the table below.

TABLE

| Panel material | Percent copolymer | Release value (p.s.i.) |
|---|---|---|
| Steel | 2.5 | 6 |
| Do | 2.5 | <3 |
| Glass | 0.5 | 13 |
| Do | 2.5 | <3 |
| Steel | 50 | 12 |
| Aluminum | 2.5 | <3 |
| Standard Navy paint system on steel | 25 | 6 |
| Glass | 0.05 | <3 |
| Do | 0.25 | <3 |
| Do | 0.025 | <3 |
| Do | 10 | 3 |
| Do | 2 | <3 |
| Do | 1 | 12 |
| Do | 2 | <3 |
| Do | 0.5 | 13 |
| Do | 1 | <3 |

EXAMPLE 2

Five percent of the copolymer salt of Example 1 in isopropyl alcohol was brushed onto an aluminum panel. Upon testing this panel was found to have a release value of less than 3 p.s.i.

EXAMPLE 3

A moderate spray was applied to a glass panel by means of an aerosol containing one percent of the copolymer salt of Example 1. Upon testing this panel was found to have a release value of less than 3 p.s.i.

EXAMPLE 4

An ice release formulation was prepared as in Example 1 with the exception that the acetic acid was omitted. Thus, the resultant product was a solution of the copolymer per se in isopropyl alcohol instead of a solution of the acetate salt. Two aluminum panels were treated by applying a solution containing 0.5 percent of the copolymer in isopropyl alcohol to their surface. Two other aluminum panels were similarly treated using a solution containing 0.5 percent of the acetate salt of the copolymer of Example 1. The four panels were then tested to determine whether or not any significantly different results would be obtained by using the copolymer per se instead of the salt of the copolymer. The panels treated with the copolymer per se were found to have release values of 10 and 12 p.s.i. respectively while the panels treated with the salt of the copolymer of Example 1 were found to have release values of 12 and 14 p.s.i. respectively. These results show that there is no significant difference in the results obtained with the two materials.

EXAMPLE 5

Thin sheets of butyl rubber were adhered to three one-quarter inch aluminum panels to simulate rubber covered aircraft surfaces or de-icing boots. A spray was applied to the rubber surfaces of these panels by means of an aerosol containing 7 percent of the copolymer salt of Example 1. Upon testing, the average release value of the three panels was found to be 10 p.s.i.

EXAMPLE 6

A solution of 2.5 percent of the copolymer salt of Example 1 in a mixture of isopropyl alcohol and water was applied to two glass panels and wiped with a tissue until dry. Upon testing both panels were found to have release values of less than 3 p.s.i.

EXAMPLE 7

An ice release formulation was prepared as in Example 1 with the exception that a silane of the formula $(CH_3O)_2(CH_3)Si(CH_2)_3NH(CH_2)_2NH_2$ was substituted for the silane of Example 1. A solution of 50 percent of the resultant copolymer salt in isopropyl alcohol was applied to a standard Navy paint system on a steel panel. Upon testing the panel was found to have a release value of 4 p.s.i.

EXAMPLE 8

A 0.5 percent solution of the copolymer salt of Example 1 in isopropyl alcohol was applied to a glass panel. The panel was then subjected to three consecutive release tests. The release values obtained were 12, 17 and 15 p.s.i. respectively.

EXAMPLE 9

A 0.5 percent solution of the copolymer salt of Example 7 is isopropyl alcohol was applied to a glass panel. The panel was then subjected to three consecutive release tests. The release values obtained were less than 4, 8 and 14 p.s.i. respectively.

EXAMPLE 10

An ice release formulation was prepared as in Example 1 with the exception that a silane of the formula $(CH_3O)_3Si(CH_2)_3NH(CH_3)$ was substituted for the silane of Example 1. A 0.5 percent solution of the resultant copolymer salt in isopropyl alcohol was applied to a glass panel. The panel was then subjected to three consecutive release tests. The release values obtained were 7, 11 and 13 p.s.i. respectively.

EXAMPLE 11

The procedure of Example 8 was repeated using a 1.25 percent solution of the copolymer salt of Example 1. The release values obtained were, less than 3, less than 3 and 12 p.s.i. respectively.

EXAMPLE 12

The procedure of Example 9 was repeated using a 1.25 percent solution of the copolymer salt of Example 9. The release values obtained were, less than 3, less than 3 and 5 p.s.i. respectively.

EXAMPLE 13

The procedure of Example 10 was repeated using a 1.25 percent solution of the copolymer salt of Example 10. The release values obtained were, less than 3, less than 3 and 7 p.s.i. respectively.

EXAMPLE 14

An ice release formulation was prepared by mixing one percent of the copolymer salt of Example 1, 10 percent of a polydimethylsiloxane fluid having a viscosity of 1000 cs. at 25° C. and 89 percent of Skellysolve L solvent (a hydrocarbon solvent which is essentially mixed octanes and has a distillation range of 225–280° F.). The resultant mixture was applied to a glass panel. Upon testing the release value of the panel was found to be less than 3 p.s.i.

EXAMPLE 15

An ice release formulation similar to that of Example 14 was made by mixing 0.1 percent of the copolymer salt of Example 1, one percent of the polydimethylsiloxane fluid and 98.9 percent of the Skellysolve L solvent and applied to a glass panel. Upon testing the release value of the panel was found to be less than 3 p.s.i.

EXAMPLE 16

Another ice release formulation similar to that of Example 14 was made by mixing 0.5 percent of the copolymer salt of Example 1, 5 percent of the polydimethylsiloxane fluid and 94.5 percent of the Skellysolve L solvent and applied to a glass panel. Upon testing the release value of the panel was found to be less than 3 p.s.i.

For comparison

Examples 17 to 20 show that the individual components of the copolymer of Example 1 and the polydimethylsiloxane of Example 14 are not effective as ice release agents.

EXAMPLE 17

1, 5 and 10 percent solutions of the hydroxylated polydimethylsiloxane fluid of Example 1 in isopropyl alcohol were prepared and applied to glass panels. Upon testing the release values of the respective panels were found to be, greater than 45, greater than 33 and greater than 33 p.s.i. respectively.

EXAMPLE 18

A 5 percent solution of the silane $$(CH_3O)_3Si(CH_2)_3NH(CH_2)_2NH_2$$

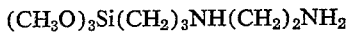

of Example 1 in isopropyl alcohol was prepared and applied to a glass panel. Upon testing the release value of the panel was found to be greater than 33 p.s.i.

EXAMPLE 19

A 5 percent solution of the acetate salt of the silane $(CH_3O)_3Si(CH_2)_3NH(CH_2)_2NH_2$ of Example 1 in isopropyl alcohol was prepared and applied to a glass panel. Upon testing the release value of the panel was found to be greater than 33 p.s.i.

EXAMPLE 20

A 25 percent solution of the polydimethylsiloxane of Example 14 is Skellysolve L was prepared and applied to a glass panel. Upon testing the release value of the panel was found to be greater than 33 p.s.i.

Examples 21 and 22 show that the copolymer gives good ice release in the presence of excess silane or excess hydroxylated polydimethylsiloxane.

EXAMPLE 21

An ice release formulation was prepared by mixing 20 g. of a hydroxylated polydimethylsiloxane fluid containing about 3.5 to 4.5 percent by weight of hydroxyl groups and having a viscosity in the range of 35 to 50 cs. at 25° C., 5 g. of a silane of the formula $$(CH_3O)_3Si(CH_2)_3NH(CH_2)_2NH_2$$

4 g. of acetic acid and 25 g. of isopropyl alcohol. The resultant product was a solution of the acetate salt of the copolymer of the formula

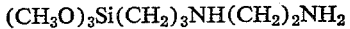

$$\left[ HO(\overset{(CH_3)_2}{\underset{|}{Si}}O)_x \right]_3 Si(CH_2)_3NH(CH_2)_2NH_2$$

(wherein $x$ has a total value of about 12) and the excess silane in isopropyl alcohol. A 5 percent solution of the copolymer salt in isopropyl alcohol was applied to a glass panel. Upon testing the release value of the glass panel was found to be 6 p.s.i.

EXAMPLE 22

An ice release formulation was made by mixing 22.5 g. of a hydroxylated polydimethylsiloxane fluid containing about 3.5 to 4.5 percent by weight of hydroxyl groups and having a viscosity in the range of 35 to 50 cs. at 25° C., 1.1 g. of a silane of the formula $$(CH_3O)_3Si(CH_2)_3NH(CH_2)_2NH_2$$

0.8 g. of acetic acid and 22 g. of isopropyl alcohol. The resultant product was a solution of the acetate salt of the copolymer of the formula

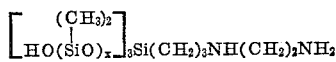

$$\left[ HO(\overset{(CH_3)_2}{\underset{|}{Si}}O)_x \right]_3 Si(CH_2)_3NH(CH_2)_2NH_2$$

(wherein $x$ has a total value of about 12) and the excess hydroxylated polydimethylsiloxane fluid in isopropyl alcohol. A 2 percent solution of the copolymer salt in isopropyl alcohol was applied to a glass panel. Upon testing the release value of the panel was found to be less than 3 p.s.i.

EXAMPLE 23

An ice release formulation was made as in Example 1 with the exception that a silane of the formula $$(CH_3O)_3Si(CH_2)_3NH_2$$

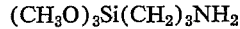

was substituted for the silane of Example 1. A 2 percent solution of the resultant copolymer salt in isopropyl alcohol was applied to a glass panel. Upon testing the release value of the panel was found to be less than 3 p.s.i.

EXAMPLE 24

When an ice release formulation is made as in Example 1 with the exception that a silane of the formula $$(CH_3O)(CH_3)_2Si(CH_2)_3NH(CH_2)_2NH_2$$

is substituted for the silane and propionic or formic acid is substituted for the acetic acid of Example 1, good ice release is obtained with the resultant copolymer salts.

EXAMPLE 25

When ice release formulations are made as in Example 7 with the exception that a silane containing an ethyl, propyl, amyl or heptyl group attached to the silicon atom instead of a methyl group is used, good ice release is obtained with the resultant copolymer salt.

EXAMPLE 26

When an ice release formulation is made as in Example 23 with the exception that a silane of the formula $(CH_3O)_2(CH_3)Si(CH_2)_3NH_2$ is substituted for the silane of Example 23, good ice release is obtained with the resultant copolymer salt.

EXAMPLE 27

When an ice release formulation is made as in Example 24 with the exception that a silane of the formula $(CH_3O)(CH_3)(C_3H_7)Si(CH_2)_3NH(CH_2)_2NH_2$ is substituted for the silane of Example 24, good ice release is obtained with the resultant copolymer salt.

EXAMPLE 28

When ice release formulations are made as in Example 22 with the exception that in the copolymer $x$ has a total value of about 75 or 200, good ice release is obtained with the resultant formulations.

EXAMPLE 29

To a flask there was added 45.8 g. of a hydroxylated polydimethylsiloxane fluid having a viscosity of about 70 cs. at 25° C., 3.7 g. of a silane of the formula $$(CH_3O)_2(CH_3)Si(CH_2)_3NHCH_2CH_2NH_2$$

2.8 g. of acetic acid and 47.7 g. of isopropyl alcohol. The mixture was refluxed at 85° C. for 16 hours and then cooled to room temperature. The resultant product was an isopropanol solution of the acetate salt of the copolymer of the formula

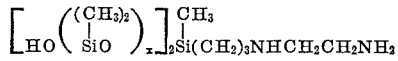

$$\left[ HO\left(\overset{(CH_3)_2}{\underset{|}{Si}}O\right)_x \right]_2 \overset{CH_3}{\underset{|}{Si}}(CH_2)_3NHCH_2CH_2NH_2$$

The above solution was diluted to 1% of silicone solids by the addition of a mixture of water and isopropanol (80% water-20% isopropanol). This 1% solution was then tested as a water repellent by spraying it on the windshield of an airplane cabin in a wind tunnel. A 140 knot wind and 1.4 inches of "rain" per hour were used in the test. The material was found in this test to be an excellent water repellent, having good clarity and life. The dilute solution was then tested on both small (Beechcraft) and commercial planes under actual flight conditions where such a water repellent would be useful. The material was also found to be an excellent water repellent under these conditions.

That which is claimed is:

1. A method of treating a surface, selected from the group consisting of siliceous, metal, plastic, rubber and painted surfaces, to render it water repellent and/or to facilitate the release of ice therefrom which comprises applying to said surface a copolymer selected from the group consisting of copolymers having the general formula

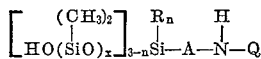

and the salts thereof derived from monocarboxylic acids containing 1 to 3 carbon atoms, wherein $x$ has a total value of from 10 to 400 inclusive, $n$ is an integer from 0 to 2 inclusive, R is an alkyl radical containing 1 to 7 inclusive carbon atoms, A is a divalent hydrocarbon radical selected from the group consisting of the $-(CH_2)_3-$ and $-CH_2CH(CH_3)CH_2-$ radicals and Q is selected from the group consisting of hydrogen, $-CH_3$ and $-CH_2CH_2NH_2$.

2. The method of claim 1 wherein $n$ is 0, A is $-(CH_2)_3-$ and Q is $-CH_2CH_2NH_2$.

3. The method of claim 2 wherein the copolymer is in the form of the acetate salt.

4. The method of claim 3 wherein the surface is a windshield.

5. The method of claim 1 wherein $n$ is 0, A is $-CH_2CH(CH_3)CH_2-$ and Q is $-CH_2CH_2NH_2$.

6. The method of claim 5 wherein the copolymer is in the form of the acetate salt.

7. The method of claim 6 wherein the surface is a windshield.

8. The method of claim 1 wherein $n$ is 1, R is a methyl radical, A is $-(CH_2)_3-$ and Q is $-CH_2CH_2NH_2$.

9. The method of claim 8 wherein the copolymer is in the form of the acetate salt.

10. The method of claim 9 wherein the surface is a windshield.

11. The method of claim 1 wherein $n$ is 0, A is $-(CH_2)_3-$ and Q is $-CH_3$.

12. The method of claim 11 wherein the copolymer is in the form of the acetate salt.

13. The method of claim 1 wherein $n$ is 0, A is $-(CH_2)_3-$ and Q is hydrogen.

14. The method of claim 13 wherein the copolymer is in the form of the acetate salt.

References Cited

UNITED STATES PATENTS

| | | |
|---|---|---|
| 2,503,919 | 4/1950 | Patnode. |
| 2,612,458 | 9/1952 | Stedman. |
| 2,814,572 | 11/1957 | Frye. |
| 2,881,184 | 4/1959 | Pike. |
| 2,899,943 | 8/1959 | Haensel et al. |
| 2,921,950 | 1/1960 | Jex et al. |
| 2,947,771 | 8/1960 | Bailey. |
| 2,949,434 | 8/1960 | Bailey et al. |
| 3,014,814 | 12/1961 | McConica. |
| 3,022,270 | 2/1962 | Lisanke. |
| 3,085,908 | 4/1963 | Morehouse et al. __ 117—135.1 X |
| 3,175,921 | 3/1965 | Hedlund. |

OTHER REFERENCES

Johannson, O. K., et al.: The Use of Liquid Dimethylsilicones to Produce Water-Repellent Surfaces on Glass-Insulator Bodies, Proceedings of the I.R.E. and Waves and Electrons, 34 (5), pp. 296–302, May 1946.

ALFRED L. LEAVITT, Primary Examiner

J. R. BATTEN, JR., Assistant Examiner

U.S. Cl. X.R.

106—2, 13; 117—121, 124, 126, 161; 260—46, 448